No. 794,572. PATENTED JULY 11, 1905.
C. WAGNER.
TESTING BOTTLE.
APPLICATION FILED MAR. 3, 1905.
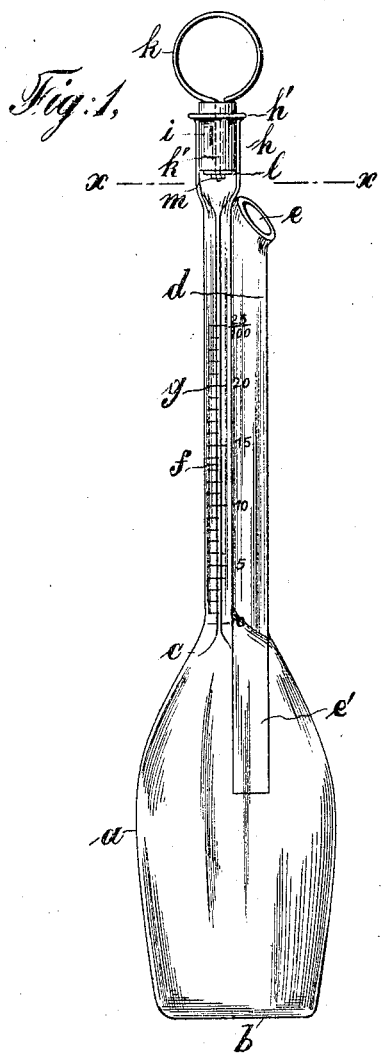
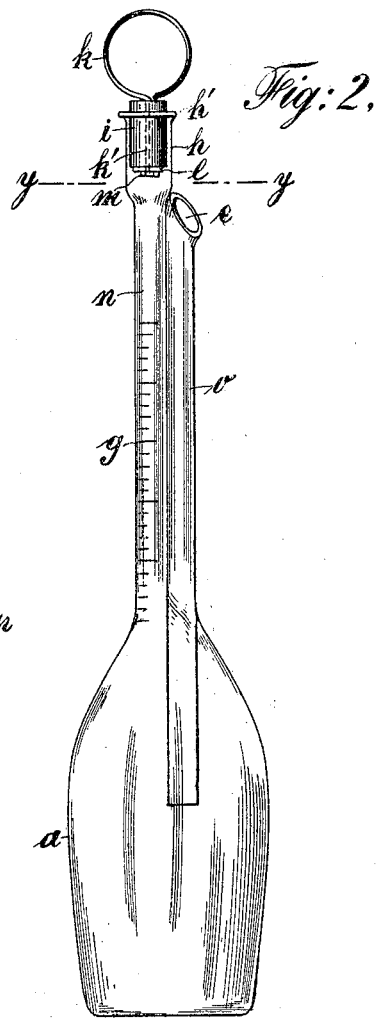
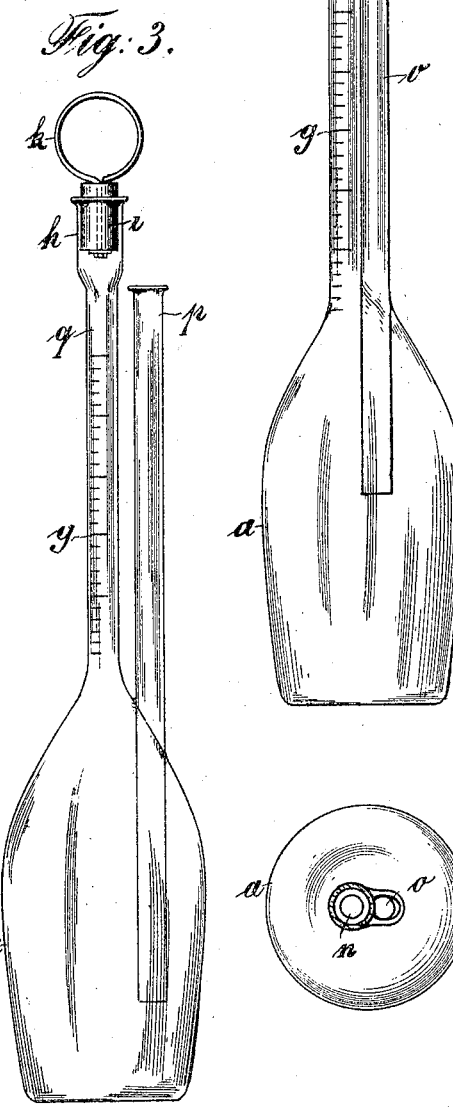
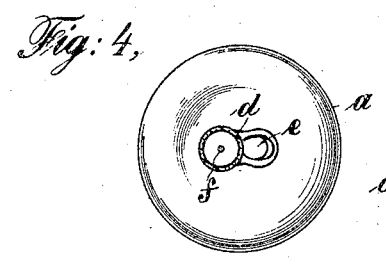
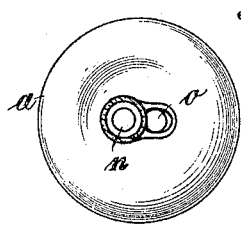
Witnesses
Max B. A. Doring
Agnes Simmons
Inventor
Constantin Wagner
By his Attorney
L. K. Bohm No. 794,572.

Patented July 11, 1905.

UNITED STATES PATENT OFFICE.

CONSTANTIN WAGNER, OF NEW YORK, N. Y.

TESTING-BOTTLE.

SPECIFICATION forming part of Letters Patent No. 794,572, dated July 11, 1905.

Application filed March 3, 1905. Serial No. 248,323.

*To all whom it may concern:*

Be it known that I, CONSTANTIN WAGNER, a citizen of the United States of America, and a resident of the borough of Bronx, New York city, in the county and State of New York, have invented certain new and useful Improvements in Testing-Bottles, of which the following is a specification.

This invention has reference to improvements in testing-bottles, and relates particularly to bottles designed for the testing of milk.

The novel testing-bottles may be used for the testing of whole milk, as well as skim-milk.

In testing milk it is desirable to have the butter-fat in the graduated tube at the zero-point, if possible, for the purpose of making an exact reading conveniently. The butter-fat in the graduated tube of the bottles heretofore employed could be brought to the zero-point by pouring into the bottle or taking out of same liquid. In some instances a compass or dividers were used to measure the exact height of the column of the butter-fat by applying then the compass with the one leg on the zero-mark. This is inconvenient and rather tedious work.

By means of my novel improvement I am enabled to regulate the position of the butter-fat in the graduated tube very easily, accurately, and without loss of time.

The invention is illustrated in the accompanying drawings, in which—

Figure 1 represents in front elevation a skim-milk bottle which embodies my invention. Figs. 2 and 3 illustrate in front elevation whole-milk bottles embodying my invention. Fig. 4 is a top plan view, partly in section, on line $x\ x$ of Fig. 1. Fig. 5 is a top plan view, partly in section, on line $y\ y$ of Fig. 2.

Similar characters of reference denote like parts in all the figures.

In the drawings, $a$ represents the bottle proper, which has a bottom $b$. At the top the body of the bottle gradually tapers, as shown at $c$. The skim-milk bottle (illustrated in Fig. 1) is provided with a two-bore single neck $d$, of which the bore $e$ is relatively wide and extends down into the interior of the body of the bottle, forming there an independent tubular portion $e'$. During the use of the bottle the liquids to be tested and the testing liquids are poured into the bottle through this wide part of the two-bore single neck $e$. The second bore of the two-bore neck $f$ is a capillary one, having on its outside graduations $g$. The capillary part of the neck is divided into hundredths of one per cent., and the scale on this bottle runs up from zero to twenty-five hundredths of one per cent., as shown in Fig. 1. To the top of the capillary part of the two-bore neck is blown an enlarged portion $h$, which has a wide bore and a small rim $h'$ at the top. Into this tubular portion $h$ fits an elastic stopper $i$, which may be made of rubber, cork, or any other suitable material. The stopper $i$ is provided with a wire ring $k$, secured thereto in any convenient manner. In Fig. 1 the one end $k'$ of the wire ring passes longitudinally through the center of the stopper. At the bottom of the stopper the said portion $k'$ of the wire passes a washer $l$ and is permanently secured by a screw and nut, as shown in Fig. 1. This stopper with wire ring acts as a piston, and the position of the butter-fat in the graduated tube is regulated thereby, as will be fully explained farther down.

Assuming now that a test with skim-milk has been made and the butter-fat collected in the capillary bore $f$, which happens, as usual, not to start at the zero-point, then the stopper with ring, which I will call the "piston," enters into action. When the butter-fat stands with its lowest end anywhere above the zero-point, then the piston is forced a little farther down into the enlarged tubular portion $h$ of the capillary bore $f$. Hereby the air contained below the piston in the tubular portion $h$ and the upper portion of the capillary bore $f$ is somewhat compressed, whereby the butter-fat in the capillary bore is forced downward. The operator seeing the downward movement of the butter-fat in the capillary bore stops forcing down the piston when the bottom surface of the butter-fat has reached the zero-point of the scale, and an exact and convenient reading is now made. It is of course understood that the wide bore *e* of the two-bore neck remains always open and in communication with the atmosphere. Therefore the butter-fat readily moves downward in the capillary bore when the piston is pressed down. Assuming now that part of the butter-fat in the capillary bore is below the zero-point of the scale, then the operator simply draws up the piston in the wide tubular portion *h*, whereby the air below same is somewhat rarefied. This will cause the butter-fat to rise, and the operator stops moving up as soon as he sees that the bottom surface of the butter-fat is exactly on the zero-point of the scale, when a quick and correct reading may conveniently be made. The importance of the attachment of the wide tubular portion *h* to the capillary part of the tube is thus apparent.

The whole-milk bottle (illustrated in Figs. 2 and 5) is constructed and operated exactly as the bottle shown in Fig. 1, the sole difference between the two bottles being that the graduated part *n* of its two-bore neck *o* has a wide bore, thus having room for the larger quantity of butter-fat contained in whole milk. An enlarged tubular portion is blown onto the graduated tube and the slight compression and expansion of the air in the graduated part of the two-bore neck by means of the piston regulates the position of the butter-fat as desired. The modification of the bottle (shown in Fig. 3) likewise is for the testing of whole milk, the sole difference being that this bottle is provided with two separate tubes—a filling-tube *p* and a graduated tube *q*, to the latter of which is attached the enlarged tubular portion *h*.

These bottles are primarily intended for use in testing milk. It is, however, understood that other liquids may be tested therewith when a specifically light component of same shall be determined.

Having thus described my invention, I claim as new and desire to secure by Letters Patent—

1. A testing-bottle comprising the body of the bottle, a two-bore neck thereon consisting of an ungraduated part with bore for introducing liquids and a graduated part for testing, and an enlarged tubular portion at the top of the graduated part in connection with same and integral therewith.

2. A testing-bottle comprising the body of the bottle, a two-bore neck thereon consisting of an ungraduated part with bore for introducing liquids and a graduated part for testing, an enlarged tubular portion at the top of the graduated part in connection with same and integral therewith, and an elastic stopper in the latter and means thereon for operating same so that it acts as a piston.

3. A testing-bottle comprising the body of the bottle, a two-bore neck thereon consisting of two parts, an ungraduated part with wide bore and extending down into the interior of the bottle for filling in liquids, and a graduated part having a capillary bore in communication with the interior of the bottle, and an enlarged tubular portion joined to the top end of the graduated part and integral therewith.

4. A testing-bottle comprising the body of the bottle, a two-bore neck thereon consisting of two parts, an ungraduated part with wide bore and extending down into the interior of the bottle for filling in liquids, and a graduated part having a capillary bore in communication with the interior of the bottle, an enlarged tubular portion joined to the top end of the graduated part and integral therewith, an elastic stopper in the latter, and means thereon for operating same so that it acts as a piston.

5. A testing-bottle comprising the body of the bottle, an ungraduated neck thereon having a wide bore for filling in liquids, and a graduated neck thereon both being in communication with the interior of the bottle, and an enlarged tubular portion joined to the top end of the graduated tube and integral therewith and an elastic stopper within said enlarged part, and means therein for operating same so that it acts as a piston.

Signed at New York, N. Y., this 25th day of February, 1905.

CONSTANTIN WAGNER.

Witnesses:
LUDWIG K. BÖHM,
AGNES SIMMONS.